(12) United States Patent
Warrington

(10) Patent No.: US 8,706,705 B1
(45) Date of Patent: Apr. 22, 2014

(54) SYSTEM AND METHOD FOR ASSOCIATING DATA RELATING TO FEATURES OF A DATA ENTITY

(75) Inventor: Adam Warrington, East Brunswick, NJ (US)

(73) Assignee: Conductor, Inc., New York, NY (US)

( * ) Notice: Subject to any disclaimer, the term of this patent is extended or adjusted under 35 U.S.C. 154(b) by 272 days.

(21) Appl. No.: 12/970,077

(22) Filed: Dec. 16, 2010

(51) Int. Cl.
*G06F 17/30* (2006.01)

(52) U.S. Cl.
USPC .......................................... 707/695; 707/793

(58) Field of Classification Search
None
See application file for complete search history.

(56) References Cited

U.S. PATENT DOCUMENTS

| 5,983,277 | A | * | 11/1999 | Heile et al. | 709/232 |
| 5,999,924 | A | * | 12/1999 | Bair et al. | 707/700 |
| 7,016,914 | B2 | * | 3/2006 | Nayak | 1/1 |
| 2004/0199548 | A1 | * | 10/2004 | Miller | 707/201 |

* cited by examiner

*Primary Examiner* — Syed Hasan
(74) *Attorney, Agent, or Firm* — Moritt Hock & Hamroff LLP; Steven S. Rubin, Esq

(57) ABSTRACT

A system and method for associating data relating to features of an entity. A first and second processor may receive and store first and second data relating to a first and second feature of a data entity in first and second memories. A third processor may store the first and second data in a first file in a third memory with respective time stamps. The first and second processor may receive third and fourth data relating to the first and second features and store the first and second data with respective time stamps. The third processor may compare time stamps and store data relating to the first and second features associated with the most recent time stamp.

20 Claims, 4 Drawing Sheets

SYSTEM AND METHOD FOR ASSOCIATING DATA RELATING TO FEATURES OF A DATA ENTITY

BACKGROUND OF THE INVENTION

1. Field of the Invention

This disclosure relates to a system and method for associating data relating to features of a data entity where that data may be received and collected at different times.

2. Description of the Related Art

Referring to FIG. 1, the World Wide Web ("WWW") is a distributed database including literally billions of pages accessible through the Internet. Searching and indexing these pages to produce useful results in response to user queries is constantly a challenge. A search engine is typically used to search the WWW.

A typical prior art search engine 20 is shown in FIG. 1. Pages from the internet or other source 22 are accessed through the use of a crawler 24. Crawler 24 aggregates pages from source 22 to ensure that these pages are searchable. Many algorithms exist for crawlers and in most cases these crawlers follow links in known hypertext documents to obtain other documents. The pages retrieved by crawler 24 are stored in a database 36. Thereafter, these pages are indexed by an indexer 26. Indexer 26 builds a searchable index of the pages in a database 34. For example, each web page may be broken down into words and respective locations of each word on the page. The pages are then indexed by the words and their respective locations.

In use, a user 32 uses a processor 38 to send a search query to a dispatcher 30. Dispatcher 30 compiles a list of search nodes in cluster 28 to execute the query and forwards the query to those selected search nodes. The search nodes in search node cluster 28 search respective parts of the index 34 and return search results along with a document identifier to dispatcher 30. Dispatcher 30 merges the received results to produce a final result set displayed to user 32 sorted by ranking scores based on a ranking function. This disclosure describes an improvement over these prior art technologies.

SUMMARY OF THE INVENTION

One embodiment of the invention is a method for associating data relating to features of a data entity. The method comprises receiving, by a first processor, first data relating to a first feature of a data entity at a first time; storing, by the first processor, the first data in a first memory in association with a first time stamp; and receiving, by a second processor, second data relating to a second feature of the data entity at a second time. The method further comprises storing, by the second processor, the second data in a second memory in association with a second time stamp; storing, by a third processor, the first data in a first file in a third memory in association with a third time stamp; storing, by the third processor, the second data in the first file in the third memory in association with the first data and in association with a fourth time stamp; and receiving, by the first processor, third data relating to the first feature of the data entity at a third time. The method further comprises storing, by the first processor, the third data in the first memory in association with a fifth time stamp; receiving, by the second processor, fourth data relating to the second feature of the data entity at a fourth time; storing, by the second processor, the fourth data in the second memory in association with an sixth time stamp; and comparing, by the third processor, the third time stamp with the fifth time stamp to determine a first most recent time stamp. The method further comprises determining, by the third processor, which one of the first data and the third data is associated with the first most recent time stamp; comparing, by the third processor, the fourth time stamp with the sixth time stamp to determine a second most recent time stamp; determining, by the third processor, which one of the second data and the fourth data is associated with the second most recent time stamp; and storing, by the third processor in a second file, the one of the first data and the third data associated with the first most recent time stamp, in association with, the one of the second data and the fourth data associated with the second more recent time stamp.

Another embodiment of the invention is a system effective to associate data relating to features of a data entity. The system comprises a first processor; a first memory in communication with the first processor; a second processor; a second memory in communication with the second processor; a third memory; and a third processor in communication with the first processor, the second processor and the third memory. The first processor is effective to receive first data relating to a first feature of a data entity at a first time; and store the first data in the first memory in association with a first time stamp. The second processor is effective to receive second data relating to a second feature of the data entity at a second time; and store the second data in the second memory in association with a second time stamp. The third processor is effective to store the first data in a first file in the third memory in association with a third time stamp; and store the second data in the first file in the third memory in association with the first data and in association with a fourth time stamp. The first processor is effective to receive third data relating to the first feature of the data entity at a third time; and store the third data in the first memory in association with a fifth time stamp. The second processor is effective to receive fourth data relating to the second feature of the data entity at a fourth time; and store the fourth data in the second memory in association with an sixth time stamp. The third processor is effective to compare the third time stamp with the fifth time stamp to determine a first most recent time stamp; determine which one of the first data and the third data is associated with the first most recent time stamp; compare the fourth time stamp with the sixth time stamp to determine a second most recent time stamp; determine which one of the second data and the fourth data is associated with the second most recent time stamp; and store in a second file, the one of the first data and the third data associated with the first most recent time stamp, in association with, the one of the second data and the fourth data associated with the second more recent time stamp.

Yet another embodiment of the invention is a report relating to an entity generated by receiving, by a first processor, first data relating to a first feature of a data entity at a first time and storing, by the first processor, the first data in a first memory in association with a first time stamp. The report is further generated by receiving, by a second processor, second data relating to a second feature of the data entity at a second time; storing, by the second processor, the second data in a second memory in association with a second time stamp; and storing, by a third processor, the first data in a first file in a third memory in association with a third time stamp. The report is further generated by storing, by the third processor, the second data in the first file in the third memory in association with the first data and in association with a fourth time stamp; receiving, by the first processor, third data relating to the first feature of the data entity at a third time; and storing, by the first processor, the third data in the first memory in association with a fifth time stamp. The report is further generated by receiving, by the second processor, fourth data relating to the second feature of the data entity at a fourth time; storing, by the second processor, the fourth data in the second memory in association with an sixth time stamp; and comparing, by the third processor, the third time stamp with the fifth time stamp to determine a first most recent time stamp. The report is further generated by determining, by the third processor, which one of the first data and the third data is associated with the first most recent time stamp; comparing, by the third processor, the fourth time stamp with the sixth time stamp to determine a second most recent time stamp; and determining, by the third processor, which one of the second data and the fourth data is associated with the second most recent time stamp. The report is further generated by storing, by the third processor in a second file, the one of the first data and the third data associated with the first most recent time stamp, in association with, the one of the second data and the fourth data associated with the second more recent time stamp; comparing, by the third processor, the first file with the second file; and generating a report relating to the entity based on the first file and the second file.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION OF THE PREFERRED EMBODIMENT(S)

Figure 1:
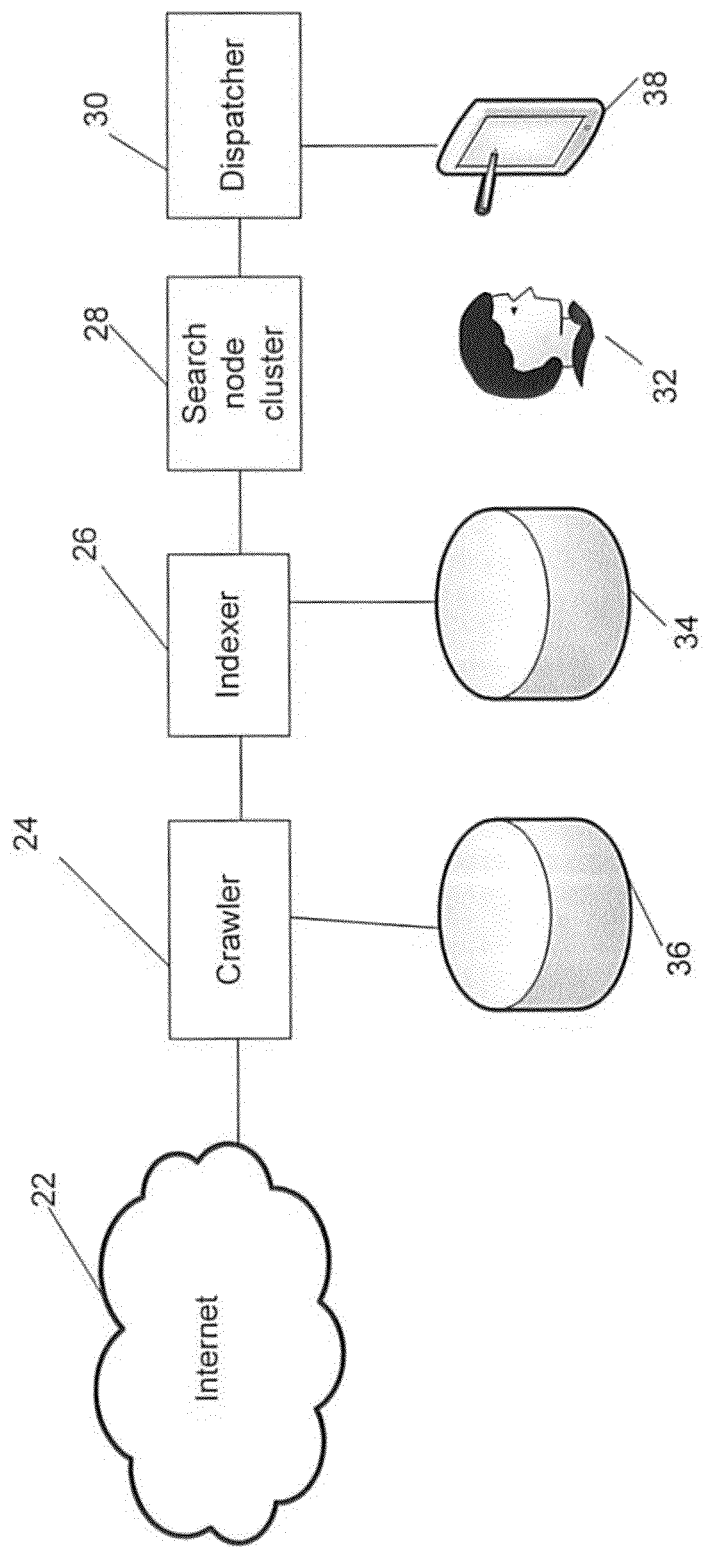
FIG. 1 is a system drawing of a search engine in accordance with the prior art.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Figure 2:
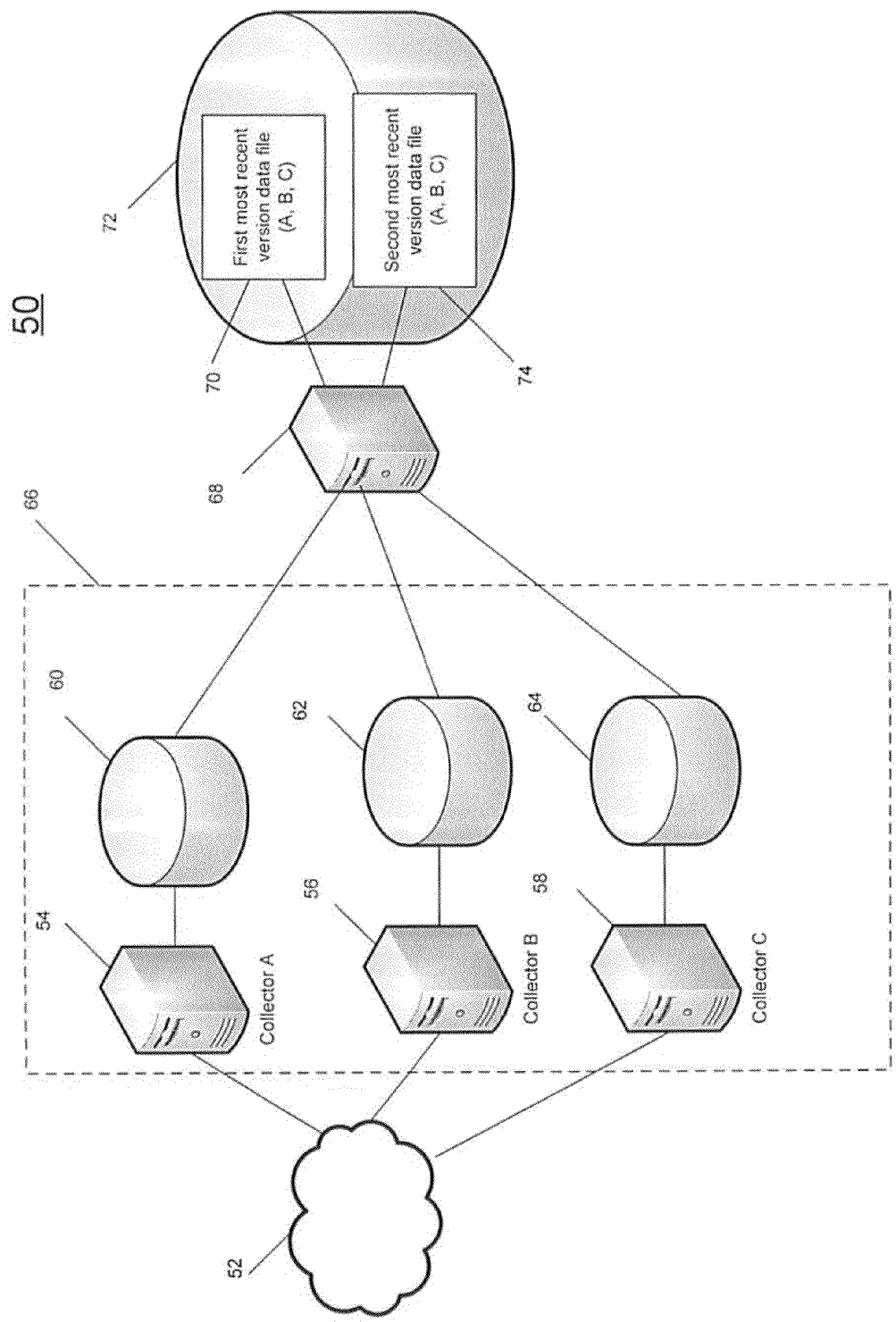
FIG. 2 is a system drawing of a system in accordance with an embodiment of the invention.

Referring to FIG. 2, there is shown a system 50 in accordance with an embodiment of the invention. As is described in more detail below, system 50 may include collector processors 54, 56, 58 each in communication with a respective memory 60, 62, 64. A processor 68 may be in communication with memories 60, 62, 64 and with a memory 72. In operation, collector processors 54, 56, and 58 may collect data relating to features of a data entity from a network such as the Internet 52. Each collector processor 54, 56, 58 may comprise a single processor or housing or multiple processors or housings in communication over a network. Each collector processor 54, 56, 58 may collect data relating to a feature of entity 66 so that, in combination, collector processors 54, 56, 58 may store a version of entity 66. For example, collector processor 54 may collect data relating to feature A of entity 66, collector processor 56 may collect data relating to feature B of entity 66, and collector processor 58 may collect data relating to feature C of entity 66.

The inventor(s) has/have learned that as data in network 52 is constantly changing, features of entity 66 may change and be collected by collector processors 54, 56, 58 at different times. As discussed in more detail below, at particular points in time, processor 68 may receive the most recent version of data relating to features A, B and C from memories 60, 62, 64. Processor 68 may associate the versions of data for each of the features and generate a first most recent version data file 70 of entity 66. At a second later time, processor 68 may receive the most recent version of data relating to features A, B, and C from memories 60, 62, 64 and receive the first most recent version data file 70. Processor 68 may produce a second most recent version data file 74 for entity 66. Second most recent version data file 74 may include the most recent data received by processor 68 for each of the features A, B and C from memories 60, 62, 64 and memory 72.

Figure 3:
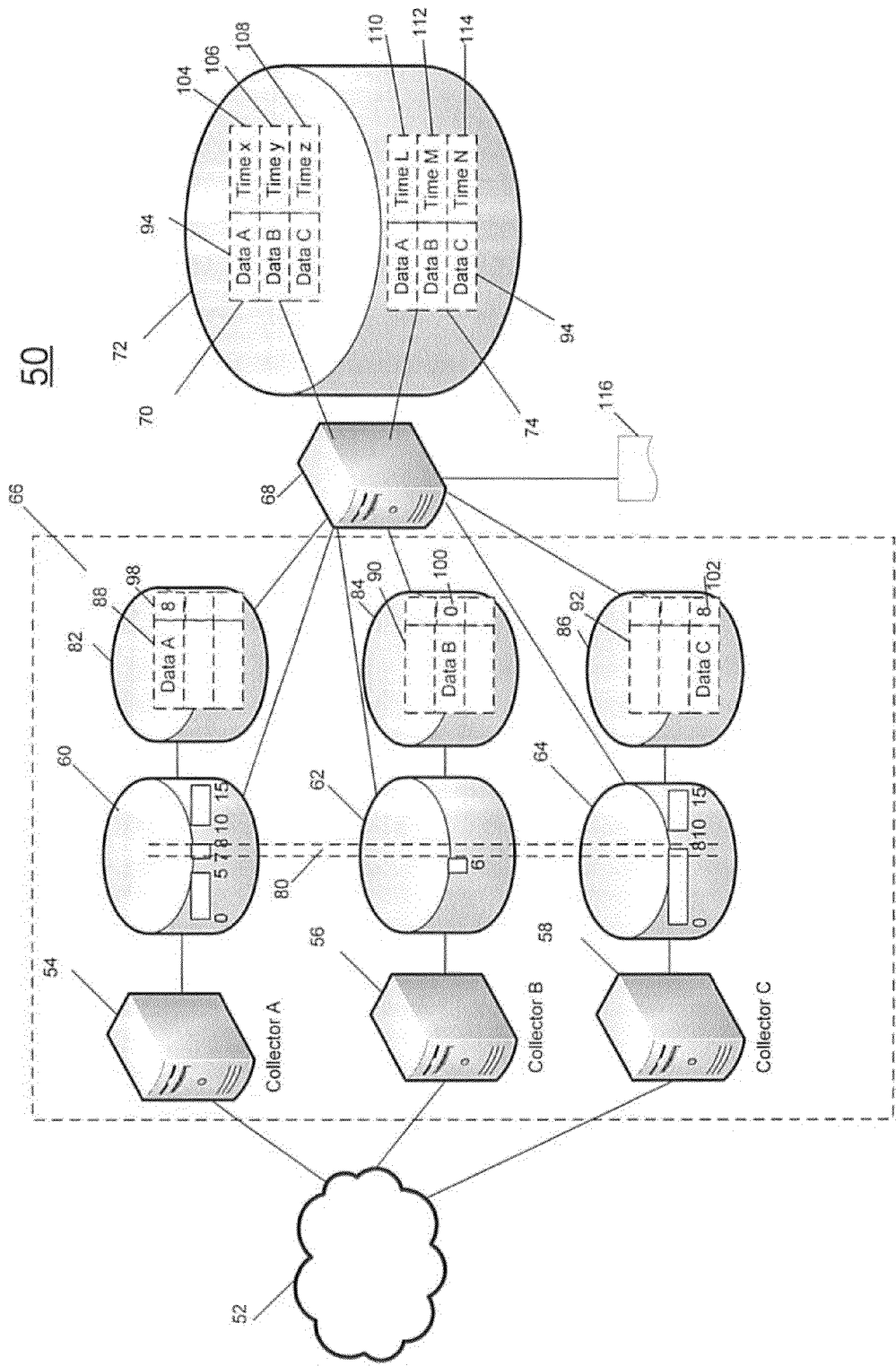
FIG. 3 is a system drawing of a system in accordance with an embodiment of the invention.

Referring to FIG. 3, there is shown more detail of system 50. As mentioned above, each collector processor 54, 56, 58 may store received data relating to respective features in respective memories. Data relating to each of these features may change and be updated and collected by collector processor 54, 56, 58 at different times and rates. As shown in an example, collector processor 54 received new data indicating updates or changes to feature A at times 0 to 5, at timed 7 to 8 and at times 10 to 15. Collector processor 56 received new data indicating changes to feature B at time 6. Collector processor 58 received new data indicating changes to feature C at times 0 to 8 and times 10 to 15.

Processor 68 may request a snapshot of the data for entity 66 updated between two particular times. In an example, a snapshot of entity 66 may be taken between time 7 and 8—as illustrated by dotted lines 80. In the example, between times 7 and 8, collection processor 54 has stored new data relating to feature A. Processor 68 may store data relating to feature A in a memory 82 in an incomplete data entity structure 88. Incomplete data entity structure 88 is formatted to include fields for data of all features of entity 66 thereby facilitating a merge and/or association of data relating to all features by processor 68. For data relating to features received by collector processor 54, data relating to feature A is stored in incomplete data entity structure 88 in memory 82, associated with a time stamp 98. In this case, the time stamp is "8" indicating that the data was most recently collected at time 8.

Similarly, in the example, between times 7 and 8, collection processor 56 has not stored any new data relating to feature B. Processor 68 may thus store no data in an incomplete data entity structure 90 in memory 84 for collector processor 56. This example is illustrated with a null set "0" shown as being stored in memory 84 in the figure.

Moreover, in the example, between time 7 and 8, collection processor 58 has stored new data relating to feature C. Processor 68 stores data relating to feature C in a memory 86 in an incomplete data entity structure 92. For data received by collector processor 58, data relating to feature C is stored associated with a time stamp 102. In this case, the time-stamp is "8" indicating that data was most recently collected at time 8. Memories 82, 84, 86 thus act like a staging area making it easier for processor 68 to merge and/or associate data received by collector processors 54, 56, 58.

At a desired time, for each feature of data entity 66, processor 68 may compare data stored in memories 82, 84, 86 with data stored in first most recent version data file 70. As illustrated, first most recent version data file 70 may include data 94 relating to each feature along with associated time stamps 104, 106, 108. Processor 68 may compare time stamp 98, 100, 102 associated with data stored in memories 82, 84, 86 with respective time stamps 104, 106, 108 associated with data stored in memory 72 for the same features. Processor 68 may store data relating to the respective feature associated with the most recent time stamp in second most recent version data file 74. For example, for data relating to feature A, memory 82 may have a time stamp 98 that is more recent than time stamp 104. In this case processor 68 may store data relating to feature A from memory 82 in second most recent data file 74. In an example for data relating to feature B, processor 68 did not store any data in structure 90. In this case, processor 68 may store data relating to feature B from first most recent data file 70 in second most recent data file 74. In this way, a most recent version of a data entity may be stored.

As an example, entity 66 could be a URL (uniform resource locator). Feature A could be the HTML (hypertext markup language) relating to a web page at the URL. Feature B could be backlinks to the URL indicating pages which link to the URL. Feature C could be a page rank of the URL. For example, an application programming interface available from GOOGLE could be used to generate the page rank data for a particular URL.

In another example, entity 66 could be a domain such as a collection of URLS. Feature A could be a site map listing the URLs in the collection. Feature B could be the robot.txt file relating to the domain. Feature C could be a page rank of the root index of the domain.

In another example, entity 66 could be a keyword. Feature A could be the text of the keyword. Feature B could be the First 100 results of a search engine results page based on the keyword. Feature C could be a monthly search volume for the keyword.

Most recent version data files 70, 74 may be stored over periods of time and/or for many points in time. Processor 68 may also compare most recent version data files 70, 74 to determine differences and store the differences. In this way, data relating to entity 66 may be stored in a compressed manner. Moreover, memory 72 may create a snapshot of portions of the Internet at particular periods in time. For example, if processor 68 creates a snapshot every 5 days, the most recent version data file with the newest time stamp will generally be less than 5 days old. Powerful reports may be generated based on most recent version data stored in memory 72 or based on differences between stored most recent version data. For example, processor 68 may generate a report 116 indicating how an entity (such as a URL or a related web page) has changed over time. Prior art techniques might require a processor to sift through a large database of collection logs and attempt to associate data relating to features of an entity.

Memory 72 may store a snapshot of portions of the Internet periodically. In this way, data relating to an entity may be stored and later reviewed. Not all data received by collector processors 54, 56 58 need to be constantly stored which would result in massive amounts of stored data. Memory 72 effectively stores raw data relating to features of entity 66. This means that even years later, raw data relating to features of entity 66 can be analyzed and searched. For example, a URL can be reviewed after it was collected and new features of the URL, whose importance today may not be appreciated, may be extracted and analyzed.

Figure 4:
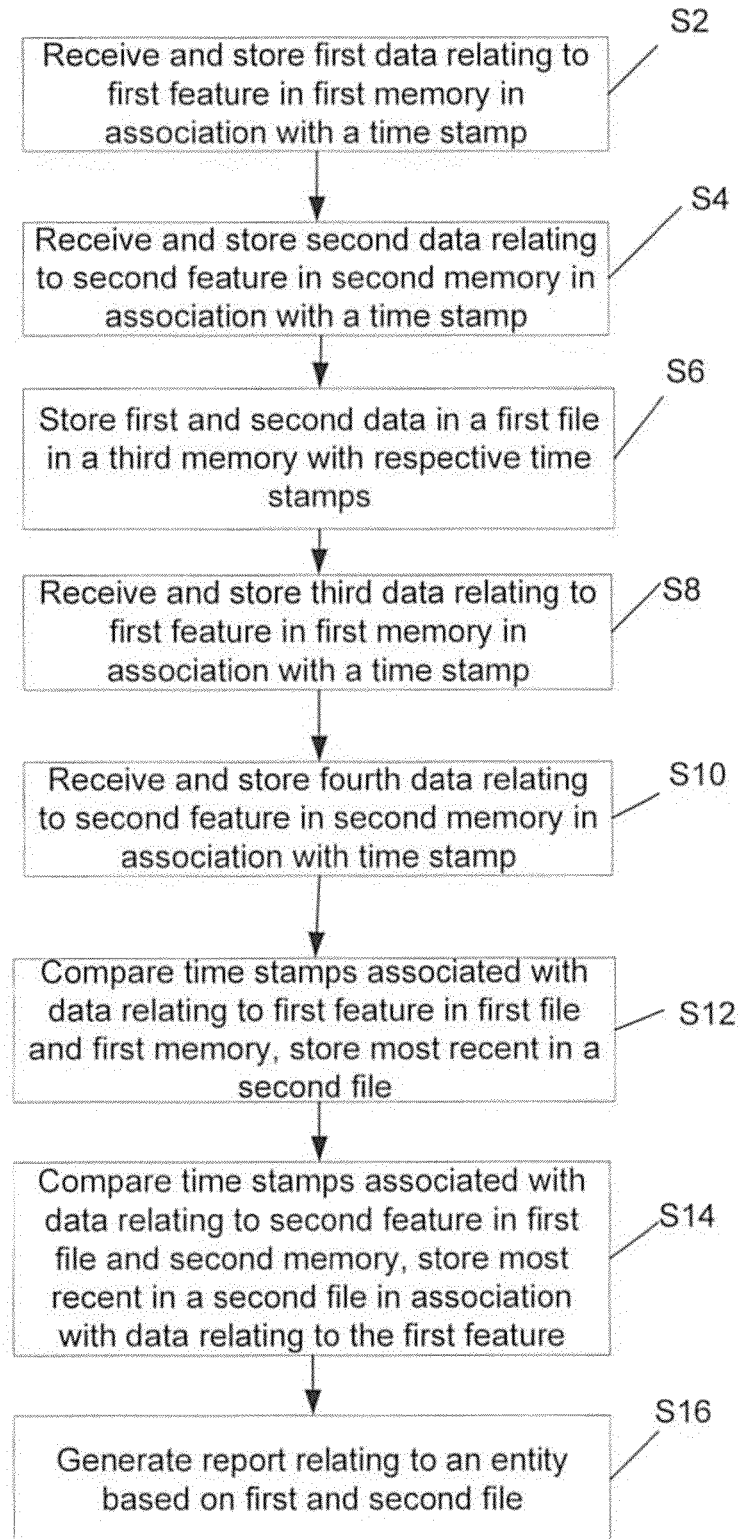
FIG. 4 is a flow chart illustrating a process which could be performed in a accordance with an embodiment of the invention.

Referring to FIG. 4, there is shown a process which could be performed in accordance with an embodiment of the invention. The process could be performed using, for example, system 50 discussed above. As shown, at step S2, a first processor may receive and store first data relating to a first feature of a data entity in a first memory in association with a time stamp. At step S4, a second processor may receive and store second data relating to a second feature of a data entity in a second memory in association with a time stamp.

At step S6, a third processor may store the first and second data in a first file in a third memory with respective time stamps. For example, the third processor may use time stamps relating to when the first and second data were stored in the first file. At step S8, the first processor may receive and store third data relating to the first feature of the data entity in the first memory in association with a time stamp. At step S10, the second processor may receive and store fourth data relating to the second feature of the data entity in the second memory in association with a time stamp.

At step S12, the third processor may compare time stamps associated with data relating to the first feature in the first file and in the first memory to determine the most recent time stamp. The third processor may store the data relating to the first feature with the most recent time stamp in a second file. At step S14, the third processor may compare time stamps associated with data relating to the second feature in the first file and in the second memory to determine the most recent time stamp. The third processor may store the data relating to the second feature associated with the most recent time stamp in a second file in association with the data relating to the first feature. At step S16, the third processor may generate a report relating to an entity based on the first file and the second file and/or differences between the first file and the second file.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for associating data relating to features of a data entity, the method comprising:
   receiving, by a first processor, first data relating to a first feature of a data entity at a first time;
   storing, by the first processor, the first data in a first memory in association with a first time stamp;
   receiving, by a second processor, second data relating to a second feature of the data entity at a second time;
   storing, by the second processor, the second data in a second memory in association with a second time stamp;
   storing, by a third processor, the first data in a first file in a third memory in association with a third time stamp;
   storing, by the third processor, the second data in the first file in the third memory in association with the first data and in association with a fourth time stamp;
   receiving, by the first processor, third data relating to the first feature of the data entity at a third time;
   storing, by the first processor, the third data in the first memory in association with a fifth time stamp;
   receiving, by the second processor, fourth data relating to the second feature of the data entity at a fourth time;
   storing, by the second processor, the fourth data in the second memory in association with a sixth time stamp;

comparing, by the third processor, the third time stamp with the fifth time stamp to determine a first most recent time stamp;
determining, by the third processor, which one of the first data and the third data is associated with the first most recent time stamp;
comparing, by the third processor, the fourth time stamp with the sixth time stamp to determine a second most recent time stamp;
determining, by the third processor, which one of the second data and the fourth data is associated with the second most recent time stamp; and
storing, by the third processor in a second file, the one of the first data and the third data associated with the first most recent time stamp, in association with, the one of the second data and the fourth data associated with the second most recent time stamp.

2. The method as recited in claim 1, further comprising:
comparing, by the third processor, the first file with the second file; and
generating a report relating to the data entity based on the first file and the second file.

3. The method as recited in claim 1, wherein:
the data entity is a URL;
the first feature is HTML of the URL; and
the second feature one of backlinks to the URL or a page rank of the URL.

4. The method as recited in claim 3, further comprising:
comparing, by the third processor, the first file with the second file; and
generating a report relating to the data entity based on the first file and the second file.

5. The method as recited in claim 1, further comprising:
comparing, by the third processor, the first file with the second file to determine a difference between the first file and the second file; and
storing, by the third processor, the difference in the third memory.

6. The method as recited in claim 1, wherein:
the data entity is a domain comprising a plurality of URLs;
the first feature is a site map of the domain; and
the second feature is one of a robot file of the domain or a page rank of a page of the domain.

7. The method as recited in claim 1, wherein:
the data entity is a keyword;
the first feature is the keyword; and
the second feature is one of a search engine result page based on the keyword or a search volume for the keyword.

8. The method as recited in claim 1, further comprising:
storing the first data in a third file in a fourth memory, the third file including fields effective to store data relating to the first feature and data relating to the second feature; and
storing the second data in a fourth file in a fifth memory, the fourth file including fields effective to store data relating to the first feature and data relating to the second feature.

9. A system effective to associate data relating to features of a data entity, the system comprising:
a first processor;
a first memory in communication with the first processor;
a second processor;
a second memory in communication with the second processor;
a third memory; and
a third processor in communication with the first processor, the second processor and the third memory;
the first processor effective to
receive first data relating to a first feature of a data entity at a first time;
store the first data in the first memory in association with a first time stamp;
the second processor effective to
receive second data relating to a second feature of the data entity at a second time;
store the second data in the second memory in association with a second time stamp;
the third processor effective to
store the first data in a first file in the third memory in association with a third time stamp;
store the second data in the first file in the third memory in association with the first data and in association with a fourth time stamp;
the first processor effective to
receive third data relating to the first feature of the data entity at a third time;
store the third data in the first memory in association with a fifth time stamp;
the second processor effective to
receive fourth data relating to the second feature of the data entity at a fourth time;
store the fourth data in the second memory in association with a sixth time stamp;
the third processor effective to
compare the third time stamp with the fifth time stamp to determine a first most recent time stamp;
determine which one of the first data and the third data is associated with the first most recent time stamp;
compare the fourth time stamp with the sixth time stamp to determine a second most recent time stamp;
determine which one of the second data and the fourth data is associated with the second most recent time stamp; and
store in a second file, the one of the first data and the third data associated with the first most recent time stamp, in association with, the one of the second data and the fourth data associated with the second most recent time stamp.

10. The system as recited in claim 9, wherein the third processor is further effective to
compare the first file with the second file; and
generate a report relating to the data entity based on the first file and the second file.

11. The system as recited in claim 9, wherein:
the data entity is a URL;
the first feature is HTML of the URL; and
the second feature one of backlinks to the URL or a page rank of the URL.

12. The system as recited in claim 11, wherein the third processor is further effective to:
compare the first file with the second file; and
generate a report relating to the data entity based on the first file and the second file.

13. The system as recited in claim 9, wherein the third processor is further effective to:
compare the first file with the second file to determine a difference between the first file and the second file; and
store the difference in the third memory.

14. The system as recited in claim 9, wherein:
the data entity is a domain comprising a plurality of URLs;
the first feature is a site map of the domain; and
the second feature is one of a robot file of the domain or a page rank of a page of the domain.

15. The system as recited in claim 9, wherein:
the data entity is a keyword;
the first feature is the keyword; and
the second feature is one of a search engine result page based on the keyword or a search volume for the keyword.

16. The system as recited in claim 9, wherein the third processor is further effective to:
store the first data in a third file in a fourth memory, the third file including fields effective to store data relating to the first feature and data relating to the second feature; and
store the second data in a fourth file in a fifth memory, the fourth file including fields effective to store data relating to the first feature and data relating to the second feature.

17. A method for generating a report relating to a data entity, the method comprising:
receiving, by a first processor, first data relating to a first feature of a data entity at a first time;
storing, by the first processor, the first data in a first memory in association with a first time stamp;
receiving, by a second processor, second data relating to a second feature of the data entity at a second time;
storing, by the second processor, the second data in a second memory in association with a second time stamp;
storing, by a third processor, the first data in a first file in a third memory in association with a third time stamp;
storing, by the third processor, the second data in the first file in the third memory in association with the first data and in association with a fourth time stamp;
receiving, by the first processor, third data relating to the first feature of the data entity at a third time;
storing, by the first processor, the third data in the first memory in association with a fifth time stamp;
receiving, by the second processor, fourth data relating to the second feature of the data entity at a fourth time;
storing, by the second processor, the fourth data in the second memory in association with a sixth time stamp;
comparing, by the third processor, the third time stamp with the fifth time stamp to determine a first most recent time stamp;
determining, by the third processor, which one of the first data and the third data is associated with the first most recent time stamp;
comparing, by the third processor, the fourth time stamp with the sixth time stamp to determine a second most recent time stamp;
determining, by the third processor, which one of the second data and the fourth data is associated with the second most recent time stamp;
storing, by the third processor in a second file, the one of the first data and the third data associated with the first most recent time stamp, in association with, the one of the second data and the fourth data associated with the second most recent time stamp;
comparing, by the third processor, the first file with the second file; and
generating the report relating to the data entity based on the first file and the second file.

18. The method of claim 17, wherein:
the data entity is a URL;
the first feature is HTML of the URL; and
the second feature one of backlinks to the URL or a page rank of the URL.

19. The method of claim 17, further comprising:
comparing, by the third processor, the first file with the second file to determine a difference between the first file and the second file; and
generating the report, by the third processor, based on the difference.

20. The report method of claim 17, further comprising:
storing the first data in a third file in a fourth memory, the third file including fields effective to store data relating to the first feature and data relating to the second feature; and
storing the second data in a fourth file in a fifth memory, the fourth file including fields effective to store data relating to the first feature and data relating to the second feature.

* * * * *